United States Patent
Aucoin et al.

(10) Patent No.: US 11,043,132 B1
(45) Date of Patent: *Jun. 22, 2021

(54) SYSTEMS AND METHODS FOR DETERMINING QUALITY AND INTEGRITY OF SOURCE INFORMATION TO DETERMINE NAVIGATION INFORMATION OF AN OBJECT

(71) Applicant: The Charles Stark Draper Laboratory, Inc., Cambridge, MA (US)

(72) Inventors: Michael A. Aucoin, North Andover, MA (US); Juha-Pekka J. Laine, Boston, MA (US)

(73) Assignee: The Charles Stark Draper Laboratory, Inc., Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/545,848

(22) Filed: Aug. 20, 2019

Related U.S. Application Data

(63) Continuation-in-part of application No. 15/435,412, filed on Feb. 17, 2017, now Pat. No. 10,386,202, and
(Continued)

(51) Int. Cl.
  *G08G 5/00* (2006.01)
  *G01C 21/20* (2006.01)
  (Continued)

(52) U.S. Cl.
  CPC ........... *G08G 5/0039* (2013.01); *G01C 21/20* (2013.01); *G06F 16/2365* (2019.01);
  (Continued)

(58) Field of Classification Search
  CPC ...... G08G 5/0039; G01C 21/20; G01S 19/08; G06F 16/2365; G06F 16/29
  See application file for complete search history.

(56) References Cited

U.S. PATENT DOCUMENTS

| | | |
|---|---|---|
| 5,923,286 A | 7/1999 | Divakaruni |
| 7,418,343 B1 | 8/2008 | McGraw et al. |

(Continued)

FOREIGN PATENT DOCUMENTS

| | | |
|---|---|---|
| EP | 2 244 063 | 10/2010 |
| EP | 2 503 510 | 9/2012 |

(Continued)

OTHER PUBLICATIONS

European Patent Office as the International Searching Authority, Authorized Officer: Michael Liebelt, Notification of Transmittal of the International Search Report and the Written Opinion of the International Searching Authority, or the Declaration, PCT/US2018/000059, 18 pages, dated Jun. 6, 2018.

(Continued)

*Primary Examiner* — Bryan Bui
(74) *Attorney, Agent, or Firm* — Sunstein LLP

(57) ABSTRACT

A navigation system for determining quality and integrity of source information includes one or more data sources that provide the source information, a situation module that provides situation data, an information module that determines an estimate of the quality and an estimate of the integrity of the source information based on the source information and the situation data, an integrity monitor module that determines the integrity and the quality of the source information based on the estimate of the quality and the estimate of the integrity of the source information from the information module, and that validates the source information based on the integrity of the source information and/or the quality of the source information, and a navigation state estimator that determines the navigation information of the one or more objects based on the validated source information and corresponding quality of the source information received from the integrity monitor module.

34 Claims, 4 Drawing Sheets

Related U.S. Application Data a continuation-in-part of application No. 16/177,419, filed on Oct. 31, 2018, which is a continuation-in-part of application No. 15/494,898, filed on Apr. 24, 2017.

(51) Int. Cl.
  *G06F 16/29* (2019.01)
  *G06F 16/23* (2019.01)
  *H04W 88/08* (2009.01)
  *G01S 19/39* (2010.01)

(52) U.S. Cl.
  CPC ........... *G06F 16/29* (2019.01); *G08G 5/0021* (2013.01); *G01S 19/396* (2019.08); *H04W 88/08* (2013.01)

(56) References Cited

U.S. PATENT DOCUMENTS

| | | | | |
|---|---|---|---|---|
| 8,200,430 | B2* | 6/2012 | Trautenberg | G01S 19/08 701/468 |
| 10,386,202 | B2* | 8/2019 | Aucoin | G01C 25/00 |
| 2008/0288167 | A1* | 11/2008 | Trautenberg | G01S 19/08 701/472 |
| 2010/0283832 | A1 | 11/2010 | Lin | |
| 2013/0265193 | A1 | 10/2013 | Kennedy et al. | |
| 2013/0338958 | A1 | 12/2013 | Shanishchara et al. | |
| 2014/0019038 | A1 | 1/2014 | Shehi et al. | |
| 2014/0025286 | A1 | 1/2014 | Donovan et al. | |
| 2014/0062781 | A1 | 3/2014 | Mathews et al. | |
| 2017/0094631 | A1 | 3/2017 | Pon et al. | |
| 2017/0322313 | A1 | 11/2017 | Revol et al. | |
| 2018/0136665 | A1 | 5/2018 | Mudalige et al. | |

FOREIGN PATENT DOCUMENTS

| | | |
|---|---|---|
| EP | 2 930 534 | 10/2015 |
| EP | 3 073 224 | 9/2016 |
| WO | WO 2018/151844 | 8/2018 |

OTHER PUBLICATIONS

European Patent Office as the International Searching Authority, Authorized Officer: Michael Liebelt, International Search Report and Written Opinion of the International Searching Authority, PCT/US2018/000073, dated Jun. 20, 2018, 13 pages.

US Navy—Commander Naval Air Systems Command, NATOPS Flight Manual Navy Model F/A-18A/B/C/D 161353 and Up Aircraft, Commander Naval Air Systems Command, Sep. 15, 2008.

* cited by examiner

SYSTEMS AND METHODS FOR DETERMINING QUALITY AND INTEGRITY OF SOURCE INFORMATION TO DETERMINE NAVIGATION INFORMATION OF AN OBJECT

RELATED APPLICATIONS

The present application is a continuation-in-part application of U.S. patent application Ser. No. 15/435,412, entitled "Systems and Methods for Determining Quality and Integrity of Source Information to Determine Navigation Information" and filed Feb. 17, 2017, now U.S. Pat. No. 10,386,202. The present application is also a continuation-in-part application of U.S. patent application Ser. No. 16/177,419, entitled "Multi-Source Distributed Navigation System Architecture" and filed Oct. 31, 2018, which is a continuation-in-part application of U.S. patent application Ser. No. 15/494,898, filed Apr. 24, 2017. These applications are hereby incorporated by reference in their entirety.

TECHNICAL FIELD

The present invention relates to determining the navigation information for one or more objects in environments when source information from at least one data source may be compromised, and more particularly, for determining which data sources should be relied on to determine navigation information.

BACKGROUND ART

Objects, such as airplane and motor vehicles, may be provided with information from data sources that are used to determine the objects' navigation information. However, the objects do not verify that the information from the data sources is reliable. Consequently, if the data source information is inaccurate, the resulting navigation information may be inaccurate, as well. Because the objects require accurate navigation information to navigate to the desired destination, the inability to obtain such reliable information may jeopardize the success of their endeavors.

SUMMARY OF THE EMBODIMENTS

In accordance with one embodiment of the invention, a navigation system determines quality and integrity of source information to determine navigation information of one or more objects during a mission. The system includes one or more data sources. Each data source is configured to provide the source information. The system also includes a situation module configured to provide situation data for a given time of the mission. The system also includes an information module configured to determine an estimate of the quality and an estimate of the integrity of the source information, at a given time, based on the source information received from the one or more data sources and based on the situation data received from the situation module for the given time.

The system also includes an integrity monitor module configured to receive the estimate of the quality and the estimate of the integrity of the source information from the information module and to receive the source information from the one or more data sources, configured to determine the integrity and the quality of the source information based on the estimate of the quality and the estimate of the integrity of the source information from the information module, and configured to validate the source information based on the integrity of the source information and/or the quality of the source information. The system also includes a navigation state estimator configured to determine the navigation information of the one or more objects based on the source information that was validated and corresponding quality of the source information received from the integrity monitor module.

The situation module may further be configured to provide expected situation data, and the given time may be after a current time of the mission. The navigation state estimator may be configured to exclude source information based on the corresponding quality of the source information received from the integrity monitor module.

In related embodiments, the navigation state estimator may further be configured to modify a mission plan to maximize performance of the navigation system. The mission plan may be modified based on the expected situation data. The mission plan may further include a route, and the navigation state estimator may modify the route based on the expected situation data.

In other embodiments, a modification to the situation data may be based on past, current, or expected performance of the one or more data sources or the navigation system. The modification may also be based on the past, current, or expected performance of the one or more data sources or the navigation system in a geographical region that overlaps with a mission plan.

In further related embodiments, the navigation system may include a graphical user interface to display the navigation information of the one or more objects to a user and permit the user to review and control the navigation information. The situation module may be configured to receive, from the graphical user interface, an instruction from the user and to provide the instruction to the information module as situation data. The instruction may, for example, modify a mission plan to maximize performance of the navigation system. The instruction may further modify a mission plan to maintain an estimated arrival time at a destination of the navigation system.

In other embodiments, the graphical user interface may be configured to display information related to past, current, or expected performance of the navigation system conducting the mission. The graphical user interface may also be configured to display contributions from the one or more data source to the navigation information for the navigation system conducting the mission.

The navigation information may include geolocation, velocity, altitude, errors in position, errors in velocity, errors in attitude, time, clock errors, propagation delays, GPS satellite errors, sensor errors, and/or sensor characterization parameters.

The navigation state estimator may include an extended Kalman filter, a particle filter, a nonlinear moment filter, a Hidden Markov Model, and/or a Bayesian filter.

In some embodiments, the situation module receives the situation data from databases with stored situation data previously known, from communication links with updated situation data that changes over time, from the one or more data sources, from detection systems that provide the situation data based on detected conditions, and/or from the navigation state estimator with expected situation data.

The situation data may include environment conditions, position information, temporal information, platform configuration, mission phase, data source location, system health, mission plan, threat data, condition of a threat, threat operating capabilities, threat location, temperature, cloud cover, visibility, barometric pressure, terrain, time of year, tides, radiation environment, population, city information, street information, building information, known transmitters, known vehicles, visible stars, and/or location of satellites in the sky.

In accordance with another embodiment of the invention, a method determines quality and integrity of source information to determine navigation information of one or more objects during a mission. The method includes providing the source information from one or more data sources. The method also includes providing situation data from a situation module for a given time of the mission. The method also includes determining an estimate of the quality and an estimate of the integrity of the source information, at the given time, based on the situation data for the given time and the source information. The method also includes determining the integrity and the quality of the source information based on the estimate of the quality and the estimate of the integrity of the source information. The method also includes validating the source information based on the integrity of the source information and/or the quality of the source information. The method also includes determining the navigation information of the one or more objects based on the source information that was validated and corresponding quality of the source information. The method further includes controlling at least one object to navigate to a desired destination based on the determined navigation information.

In some embodiments, the situation data is expected situation data, and the given time is after a current time of the mission. The method may also include excluding source information based on the corresponding quality of the source information. The method may further include modifying a mission plan to maximize performance of the one or more objects. The modification may be based on expected situation data. In other embodiments, the mission plan may include a route and the method further includes modifying the route based on the expected situation data.

The method may also include modifying the situation data based on past, current, or expected performance of the one or more data sources or the one or more objects. The modification based on past, current, or expected performance of the one or more data sources or the one or more objects may be performed for a geographical region that overlaps with a mission plan.

In further embodiments, the method may include displaying the navigation information of the one or more objects to a user and permitting the user to review and control the navigation information. The method may further include receiving an instruction from the user and providing the instruction as situation data. The instruction may modify a mission plan to maximize performance of the one or more objects. The instruction may also modify a mission plan to maintain an estimated arrival time at a destination of the one or more objects.

The method may further include displaying information related to past, current, or expected performance of the one or more objects conducting the mission. The method may also include displaying contributions from the one or more data sources to the navigation information for the one or more objects conducting the mission.

Determining the navigation information of the one or more objects may include applying an extended Kalman filter, a particle filter, a nonlinear moment filter, a Hidden Markov Model, and/or a Bayesian filter to the source information that was validated and the corresponding quality of the source information. In some embodiments, the situation module receives the situation data from databases with stored situation data previously known, from communication links with updated situation data that changes over time, from the one or more data sources, from detection systems that provide the situation data based on detected conditions, and/or from a navigation state estimator with expected situation data.

BRIEF DESCRIPTION OF THE DRAWINGS

The foregoing features of embodiments will be more readily understood by reference to the following detailed description, taken with reference to the accompanying drawings, in which.

DETAILED DESCRIPTION OF SPECIFIC EMBODIMENTS

Figure 1:
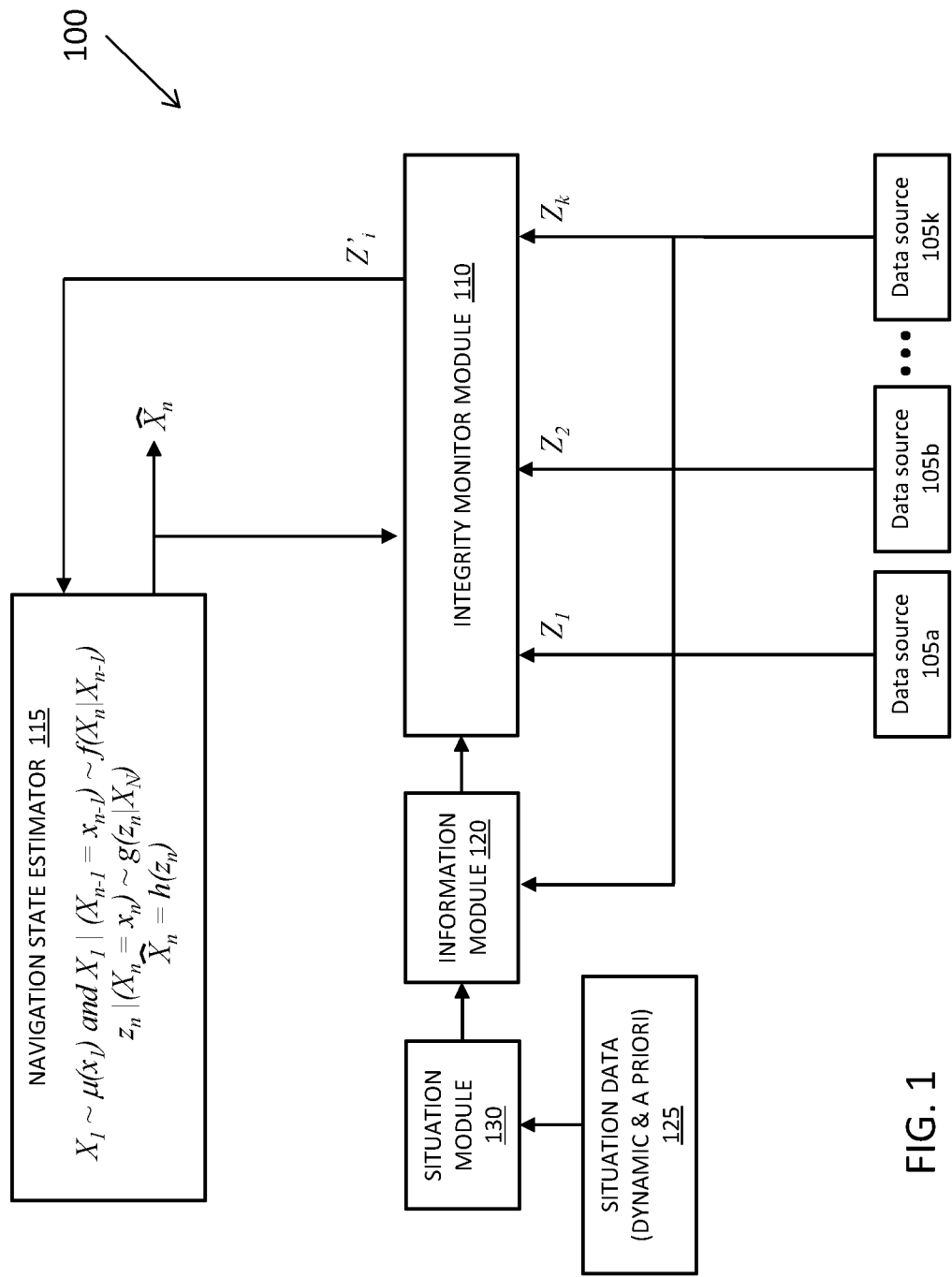
FIG. 1 depicts an exemplary system for determining quality and integrity of source information to determine navigation information of one or more objects.

Definitions. As used in this description and the accompanying claims, the following terms shall have the meanings indicated, unless the context otherwise requires:

"Object" refers to an entity that may move, such as a vehicle or person.

"Data source" refers to a source of data that provides information that may be used to determine the navigation information of one or more objects.

"Source information" refers to information provided by a data source.

"Integrity of source information" refers to a measure of source information related to whether the source information is trustworthy and from a data source that is performing as intended, e.g., the data source is not subjected to interference or jamming, and thus the source information is not altered in some way.

"Quality of source information" refers to a measure of source information related to whether a data source is providing the source information according to its specifications without any degradation, or a measure of source information that specifies the accuracy of the source information at a given time.

"Navigation information" may include the geolocation, velocity, altitude, errors in position, errors in velocity, errors in attitude, time, clock errors, propagation delays, GPS satellite errors, sensor errors, and/or sensor characterization parameters, by way of example.

Overview of the System

Embodiments of the present navigation system provide the best possible navigation information resulting from several navigation data sources or sensors in an environment in which one or more of those sources may be challenged, contested, degraded, or denied and, preferably, to do so without human intervention. Data sources in such an environment may provide widely varying navigation information quality and integrity depending on the challenges presented by the environment. In addition, the source information provided by some of the data sources may be challenged or compromised, such that the data sources have good perceived quality but, in fact, lack integrity, e.g., the source information has been compromised or altered in some way. Embodiments of the present navigation system are capable of identifying both the quality and integrity of data sources based on the environment and using this quality and integrity information in the navigation information accordingly. In addition, identification of quality and integrity of data sources is not static but instead may change over time depending on many factors, e.g., mission phase, location, and system health. Embodiments of the present navigation system maintain awareness of the situation in which the data sources are operating and maintain information model(s) describing the dynamic and probabilistic state of the source information when the situation in which the source information is obtained is fully known and a probabilistic state representing the uncertainty associated with the source information when the situation is uncertain.

For example, in both government organizations and commercial enterprises, navigation information is critical for successfully completing particular objectives. For instance, pilots and/or drones conducting missions on behalf of the military or intelligence agencies must know their geolocations to obtain meaningful information. Extraction teams tasked with rescuing civilian and military hostages must track their geolocations and times to ensure that they reach their targeted destination at the designated times. Autonomous robots deployed to search, unearth, and/or defuse land mines in previously war-torn regions risk triggering explosions if they fail to evade known land mines. Commercial pilots conducting transoceanic flights must rely on their instruments for geolocation because their environments may generally lack identifying geographical features (e.g., mountain ranges, distinct coast lines). Energy companies may send autonomous vehicles into remote and/or dangerous environments to repair or maintain equipment.

Although the Global Positioning System (GPS) is the most commonly used navigation system for providing an object with its navigation information, the GPS system is not always available or may be unreliable. For example, in some situations, the object may be proximate to an insufficient number of GPS satellites. In other situations, a particular environment may interfere with the object's ability to communicate with the satellites, despite their number and location (e.g., mountains that deflect or degrade signals). Further, an object may be subject to other types of interference, such as hostile organizations intent on spoofing or jamming GPS signals to prevent the object from obtaining accurate navigation information.

Redundant navigational capabilities decrease an object's vulnerability to erroneously determined navigation information. Other data sources, described in more detail below, may supplement and/or replace GPS signals in determining the navigation information. However, depending on the object's situation, information from one or more of these data sources may be unreliable. Like GPS, these data sources may function improperly and thereby output source information of dubious integrity, and they are also vulnerable to external interference. Thus, additional data sources may not, in and of themselves, guarantee more accurate navigation information. Furthermore, because the reliability of any given data source changes dynamically based on the data source's situation, ensuring that reliable source information is solely used to determine navigation information becomes a more challenging endeavor.

Figure 2:
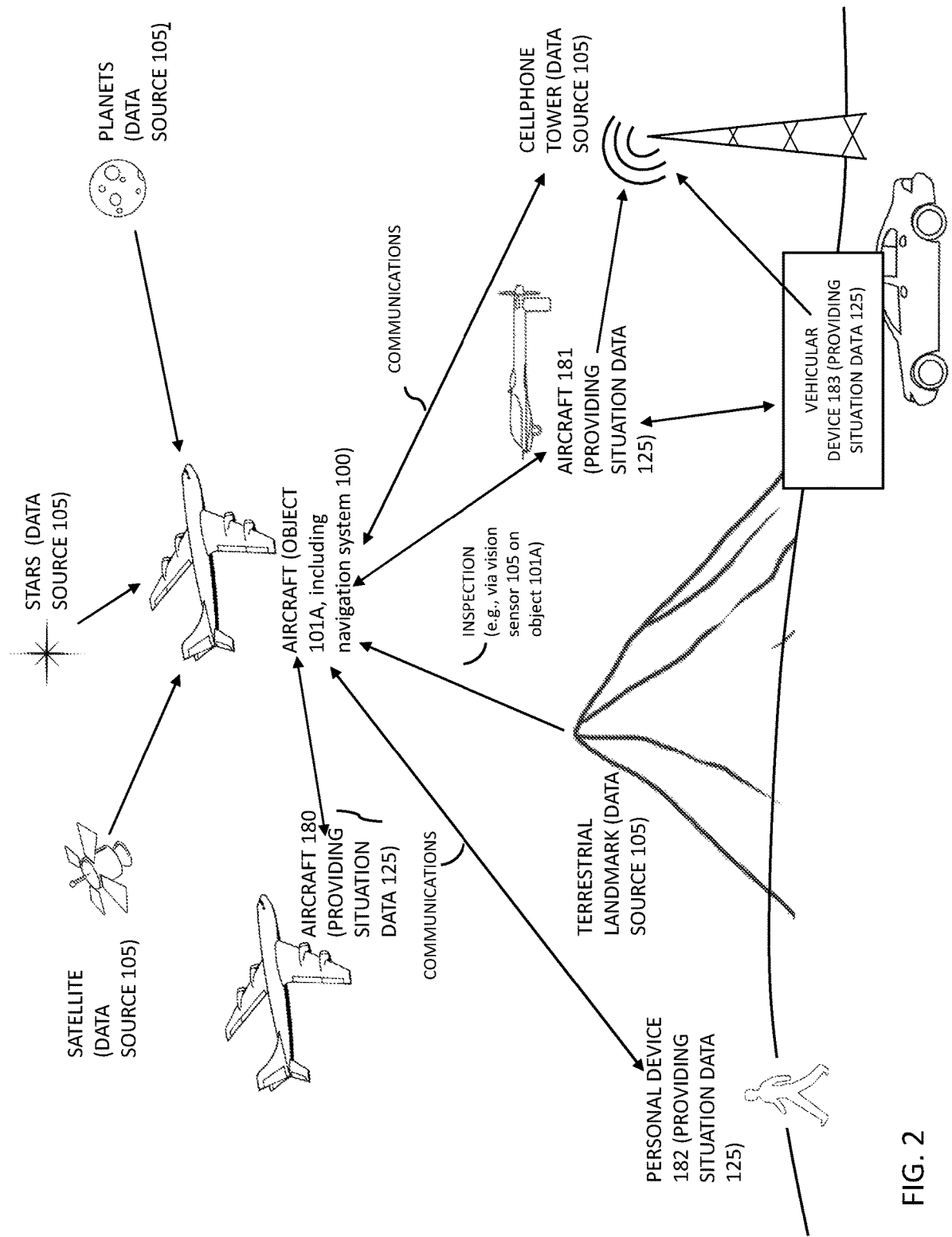
FIG. 2, FIG. 3 and FIG. 4 depict exemplary implementations of the system of FIG. 1 and environments in which the implementations may operate.
Figure 3:
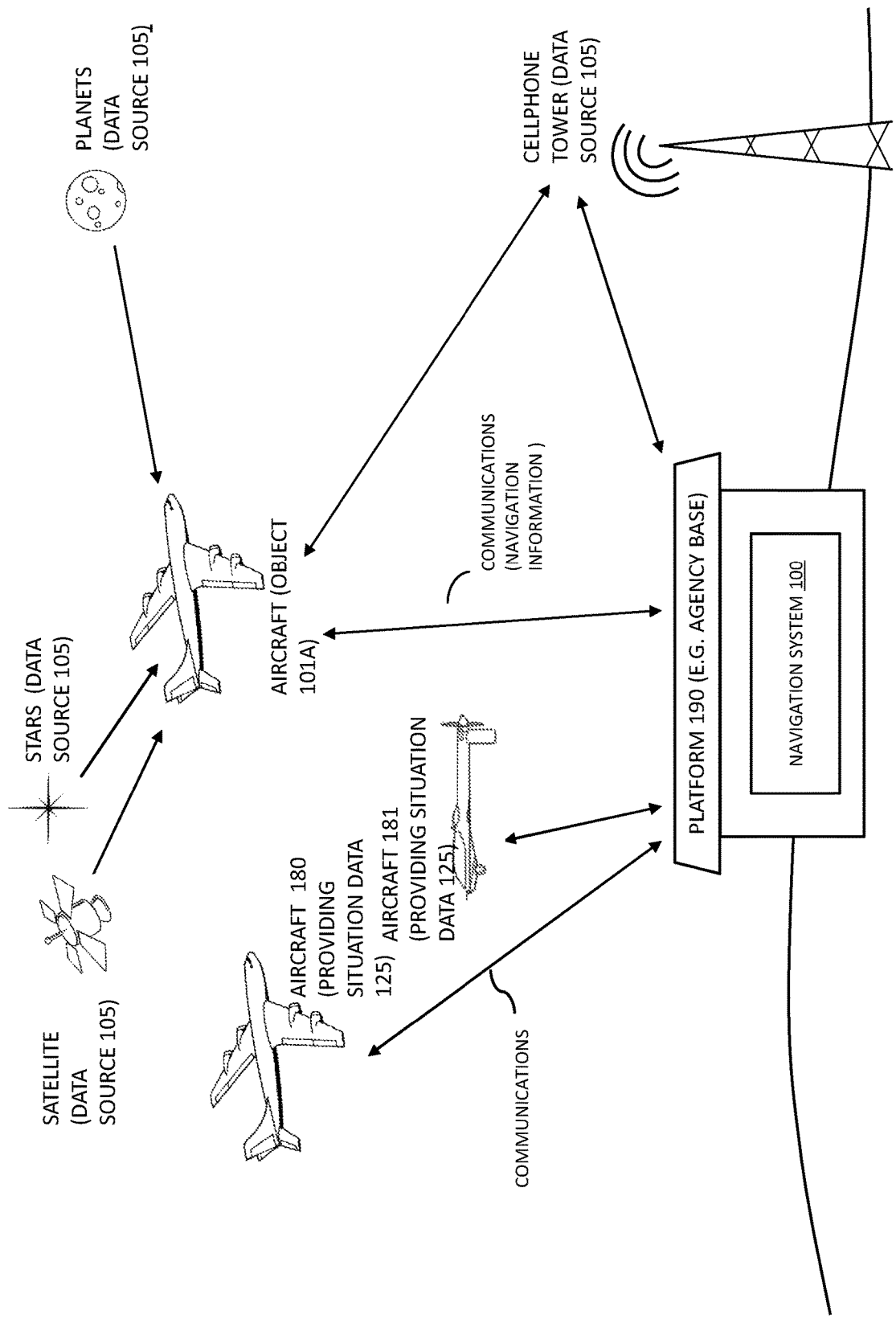
Figure 4:
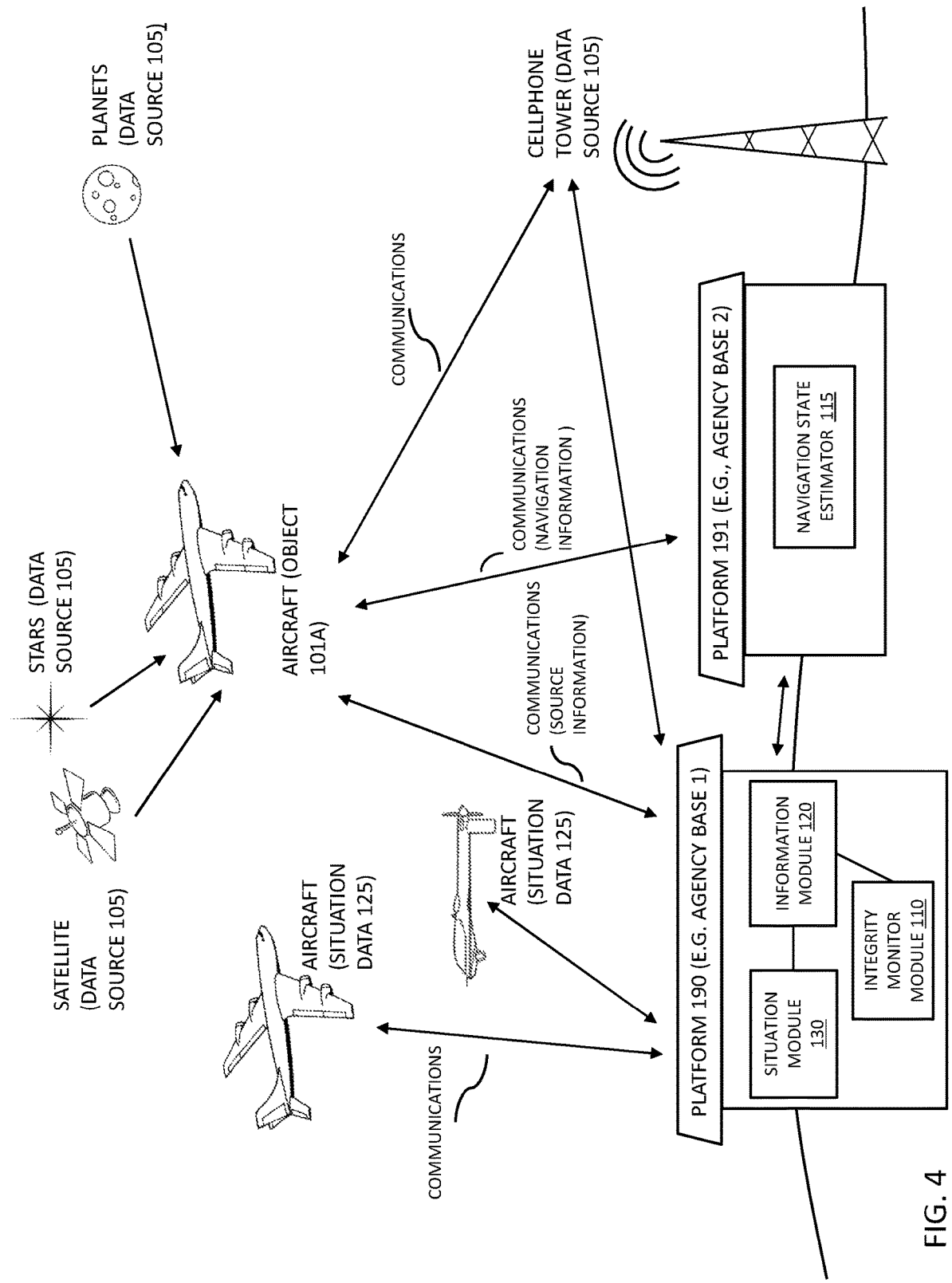

Embodiments of the present invention evaluate source information from one or more data sources and situation data to determine which data sources can be relied on for determining the navigation information of one or more objects. FIG. 1 depicts an exemplary navigation system 100 for determining navigation information for one or more objects during a mission using source information validated on the basis of its quality and/or integrity, and FIGS. 2-4 depict exemplary implementations of the navigation system of FIG. 1 and environments in which the implementations may operate.

The navigation system 100 includes multiple data sources 105a, 105b, 105k (collectively, "105") that provide source information that may be used to determine an object's navigation information. Because one or more of the data sources 105 may not be reliable at any given time during the mission, the navigation system 100 uses a situation module 130, an information module 130, an integrity monitor module 110, and a navigation state estimator 115, as described in more detail below, to identify the data sources 105 that should be relied on. The navigation system 100 may further include a graphical user interface with a display (not shown). The graphical user interface may display, for example, navigation information for the user to review and optionally control. The graphical user interface may be configured to accept user inputs, such as additional situational data as described in more detail below. For example, the user inputs may make modifications to a mission plan, which in turn modifies the navigation information.

In particular, the situation module 130 provides situation data 125 for a given time of the mission related to the data sources' situation, and the situation module 130 may aggregate the situation data 125 and send it to the information module 120. The information module 120 creates and/or maintains statistical models for estimating the quality and/or integrity of source information from any given data source 105, and uses these models with the situation data (and in some scenarios, source information as well) to determine the estimates of quality and integrity. The information module 120 provides the estimates to the integrity monitor module 110.

The integrity monitor module 110 makes the final determination of the data sources 105 that, at that particular time, should be relied on to determine the navigation information for the object(s) (also referred to herein as "validating" the information from a particular data source). The integrity monitor module 110 may validate any source information based on its integrity and/or quality, and may further determine integrity and/or quality based on information from the data sources 105 (e.g., the source information, quality of the source information, integrity of the source information), information from an information module 120 (e.g., an estimate of the quality and/or an estimate of the integrity of the source information, at a given time), or both.

The integrity monitor module 110 sends the validated source information to the navigation state estimator 115, and in some embodiments, the integrity monitor module 110 refrains from sending source information that has not been, and will not be, validated. The navigation state estimator 115 uses the validated source information to determine the navigation information, which may be transmitted to the one or more objects. In some embodiments, the navigation state estimator 115 may also transmit the navigation information to a display (not shown) for a user to view and optionally control the navigation information or to other systems, e.g., within the object (not shown). Furthermore, the navigation state estimator 115 may transmit the navigation information back to the integrity monitor module 110, where it may be used to validate subsequent source information received from the data sources 105 and/or information module 120.

As shown in FIGS. 2-4, the various components of the navigation system 100 may be located on one or more platforms in one or more locations. For example, the situation module 130, information module 120, integrity monitor module 110, and/or navigation state estimator 115 may be coupled to the object or may be remotely located from the object, e.g., on a moving platform, or at a stationary site (as shown in FIGS. 3 and 4). In addition, the components may be distributed across multiple platforms, e.g., on moving platforms and/or stationary sites (as shown in FIG. 4).

As mentioned above, the navigation system 100 may include a graphical user interface with a display for a user to review the navigation information and optionally control the navigation information. For example, the graphical user interface may accept user inputs to modify situation data, e.g., to modify a mission plan. The graphical user interface may display one or more objectives for the modifications. In response to user selection of at least one objective, the navigation system 100 may send the modifications as situation data 125 to the situation module 130, and the navigation state estimator 115 may use this information (as explained above) to provide updated navigation information to the one or more objects that may be conducting the mission.

One objective may be to maximize the performance of the one or more objects. For example, during a prior, completed mission, the data sources 105 and/or one or more of the objects may have performed poorly in one or more particular geographical regions, and thus caused one or more objects conducting the mission to be inefficient, e.g. take longer than expected or not reach the right destination. Upon receiving updated navigation information, the object may adjust its navigation information, e.g. direction and/or velocity, to improve the performance of the one or more objects.

Another objective for modifying situation data 125, such as a mission plan, may be to maintain expected completion time of the mission (e.g., expected arrival time at the destination). Because the conditions under which an object operates during a mission may result in errors or inefficiencies, costing the object additional time to get to its destination, the navigation system 100 may provide historical performance of the data source 105 and/or one or more objects at difference locations along the route. The historical performance data may be supplied as situation data 125 to the situation module 130, and the navigation state estimator 115 may use this information to provide updated navigation information to the one or more objects to maintain the expected completion time of the mission.

Alternatively, instead of selecting one or more objectives from a display of a graphical user interface, the user may directly input modifications to situation data 125, e.g., modifications to the mission plan, which ultimately modifies the navigation information provided to the one or more objects. For example, the user may change one or more portions of the mission plan to avoid particular geographical regions, such as regions projected to experience dangerous weather conditions during the mission. In another example, the user may delay the estimated departure time for the mission, or alter the velocity and/or altitude at which an object may travel. As mentioned above, the modifications may be sent as situation data 125 to the situation module 130, and the navigation state estimator 115 may use this information to provide updated navigation information to the one or more objects.

In further embodiments, the navigation system 100 may be configured to modify the situation data 125, e.g., the mission plan, based on any of the objectives presented to the user in the graphical user interface. The navigation system 100 may also be configured to automatically modify mission plans. The navigation state estimator 115 may modify the mission plan, e.g., within a predetermined period of time before the expected departure time of the mission, to ensure that the modifications are based on the most updated navigation information. For example, the navigation state estimator 115 may be configured to modify all mission plans originating from the same location as one of the one or more objects when the situation data shows that particular geographical regions have become, or are expected to become, unsafe for travel. In this case, the navigation information may reroute one or more objects and/or abort the mission altogether to avoid unacceptable risks to personnel.

The modifications to the situation data 125 may be sent to the situation module 130, and the navigation state estimator 115 in return may use this information to provide updated navigation information to the one or more objects. The modifications may be sent to one or more objects that are conducting the mission and/or to one or more objects that will communicate with the objects that are conducting the mission, such as stationary objects or objects positioned along the route of the mission.

The one or more objects may periodically receive updated navigation information, which implements changes to the mission plan, and additional navigation information that may be generated before, during, and/or after the mission. One or more objects, e.g., objects conducting the mission, may provide situation data 125 concerning the mission to the graphical user interface before, during, and/or after the mission. The display of the graphical user interface may show a comparison of the absolute navigation information to the navigation information determined by the navigation state estimator 115, and the user may review and assess the performance of the data sources 105 and/or the one or more objects.

For example, the user may review and evaluate, for every data source 105, its respective contribution to the determined navigation information. For instance, the display may show the contribution from a satellite 105, a celestial object sighting system (COSS) 105, an RF sensor system 105, a magnetic compass 105, or any of the other data sources 105 described herein. The display may show the current, past, and/or expected performance of the data source 105 and/or the one or more objects to the user. The user may evaluate the overall performance of one or more objects and the performance of individual data sources 105 with respect to integrity and/or quality, and decide to control the navigation information.

The display may show a comparison between the current performance and past performance of the data sources 105 and/or the one or more objects (e.g., performance during previously completed missions) for the same geographical region. The navigation system 100 may store situation data 125 about the performance of the data sources 105 and/or the one or more objects. The display may show the accumulated performance data to the user.

Data Sources of the Navigation System

As described above, the navigation system 100 for one or more objects may include numerous data sources 105. A data source 105 may be any sensor or source that provides source information used to determine an object's navigation information. For example, the data sources 105 may be vision sensors, laser-based sensors, and GPS sensors. Other examples include chemical sensors, such as directional chemical sensors or particulate sensors. Additional exemplary sensors include gravity-based sensors (e.g., utilizing a gravimeter), RF-based sensors (e.g., utilizing radio frequency (RF) detectors, cellular detectors, WiFi detectors, Bluetooth® detectors), electromagnetic-based sensors in other parts of the spectrum (e.g., microwave detectors, X-ray detectors, electrical field strength detectors, infrared, radar), barometers, magnetic sensors (e.g., utilizing a magnetic field sensor, a magnetometer, an induction coil, a magnetic resonator, magnetic compass), torque and acceleration sensors (e.g., gyroscopes, accelerometers), force sensors (e.g., vibration sensors, pressure sensors, inertial sensors), light sensors (e.g., optical detectors, CMOS sensors, laser system detectors), acoustic sensors (e.g., sonar, ultrasound), celestial navigation sensors (e.g., star trackers), celestial objects, (e.g., stars, planets) and thermal sensors, among others. An electronic support measures (ESM) system and/or a celestial object sighting system (COSS) may also be data sources 105.

In some embodiments, data sources 105 may be located on a platform or distributed across multiple platforms. Alternatively, or in addition, data sources 105 may be deployed in different parts of the environment, such as underground, underwater, terrestrially, in the atmosphere, and/or in space.

Situation Module

As described above, the situation module 130 provides the situation data 125 to the information module 120. The situation module 130 may aggregate situation data 125 before sending it to the information module 120. In some embodiments, the situation module 130 establishes communication links with external systems that provides situation data 125 regarding an object's and/or data sources' environment in real-time. In various embodiments, the situation module 130 is coupled to one or more input devices that respond to user input of situation data 125. Examples of such input devices include graphical user interfaces that may have a display or manual controls.

For example, the situation module 130 may capture situation data 125 provided by external sources (e.g., communication links) regarding the integrity of particular data sources 105 (e.g., a particular sensor is known to be not operating as indicated by its quality measure or is compromised with the same result). The situation module 130 may also capture other relevant situation data 125 provided by other systems, e.g., systems on the same platform that include the navigation system 100 or a different platform, such as information that may be provided by an Electronic Support Measures (ESM) system. For example, an ESM system may identify electromagnetic signals that may interfere with data sources 105, and this situation data 125 should thus be considered by the information module 120 when determining data source(s) 105 integrity and/or quality.

For example, during a mission, the navigation state estimator 115 may provide navigation information about one or more objects to the display of a graphical user interface. The navigation information may include the current status and projected status of the one or more objects along the planned route, the situational awareness picture, including active and potential threat systems or effects along the planned route, the current and/or projected performance of the data sources 105 due to the situation or environment along the planned route. For example, the display may show the data sources 105 providing source information to the one or more objects and descriptions of the integrity and/or quality of each data sources 105. The data sources 105 may be displayed in order of their reliability (e.g., data sources 105 providing high integrity, high quality source information first, and data sources 105 providing low integrity, low quality source information last).

The graphical user interface and display may also provide known and expected situations along the planned route, as well as the current and expected impact of the situations on the integrity and/or quality of the source information from the data sources 105. The situations may be organized according to proximity to the one or more objects. For example, if the mission plan has one or more objects traversing a mountain range and then entering a region known to be occupied by a hostile organization, the display may show these situations in that order. Within the display of situations currently applicable to the one or more objects, the situations may be organized by the severity of their impact on the data sources 105. For example, if the one or more objects are traversing a mountainous region that is currently experiencing heavy fog and that is also known to be occupied by a hostile organization that may spoof GPS signals, then both of these situations may be displayed by the graphical user interface on the display as impacting the integrity and/or quality of the source information from the data sources 105. For instance, the mountains may cause the GPS signals to be intermittent and the fog may degrade the one or more object's vision sensors 105. Thus, the display may show the lack of integrity of the GPS signals obtained in this region due to the hostile organization and may show the lack of integrity of GPS signals and the vision sensor signals obtained in this region due to the environmental conditions. The user may review the navigation information of the one or more objects on the display before, during, and/or after a mission may optionally control the navigation information by providing additional user inputs through the graphical user interface. For example, the user may review navigation plan and/or mission plan modifications in order to make sure that proper performance is attained. The navigation plan and/or mission plan modifications may be generated by the user, by the navigation system 100 autonomously, or by some higher authority. The navigation information may be reviewed on the display in several modes, e.g. maximum performance of the one or more objects, time-to-destination, etc. The display may also have analytical tools that allow various components in the navigation system 100 to be monitored, e.g., IMU only, celestial data sources only, etc., and may provide a history or log of the performance of the one or more objects, and comparison of the current and historical performance of the one or more objects in the same mission area.

Various types of situation data may include environment conditions (e.g., reports about inclement weather in a territory that the object or data source is expected to pass through), position information, temporal information, platform configuration, mission phase, data source location, system health, mission plan, threat data (e.g., an alert from a vehicle or an agency that a newly launched enemy mission has been detected within the object's or data sources' vicinity), condition of a threat, threat operating capabilities, threat location, temperature, cloud cover, visibility, barometric pressure, terrain, time of year, tides, radiation environment, population, city information, street information, building information, known transmitters, known vehicles, visible stars, and/or location of satellites in the sky, as well as any situation data that would be beneficial to the navigation system, as known by one of ordinary skill in the art. Situation data may also include any of the navigation information described herein, e.g., velocity and attitude.

In some embodiments, situation data 125 may be stored in one or more databases. The database(s) may include previously received situation data (e.g., apriori) and/or real-time situation data (e.g., dynamic). The databases may include data stored at the beginning of the object's travel. The databases may store situation data for the object and/or data source(s) for a predetermined period of time, e.g., the past three hours. As the databases receive additional situation data, the databases may overwrite some of the previously stored data or aggregate the data. In some embodiments, the databases may store different types of situation data for different lengths of time (e.g., tides for the past two hours, weather-related data for the past hour, etc.).

The Information Module

The information module 120 describes the integrity and the quality of the source information from the data source(s) 105 based on a dynamic, statistical representation of the situation data 125 in combination with the quality and integrity information supplied by the data source(s) 105 for the current time. The situation data 125 received from the situation module 130 may be based on apriori situation data, updates provided by communication links, and the source information provided by each of the data sources 105. The information module 120 creates or provides statistical models to determine an estimate of quality and/or an estimate of integrity, which the information module 120 provides to the integrity monitor module 110. The information module 120 maintains the models (e.g., profiles, statistics) of all data that may influence the navigation state estimator 115, e.g., given the navigation state is $X_n$, the likelihood data source 105 $i$ is compromised and should be discarded is a. For example, the information module 120 maintains statistics on data source 105 integrity and/or quality that are dependent on navigation state (e.g., position, altitude, velocity, time) and also on other factors, such as platform configuration (e.g., components included in the system), threat data (e.g., physical threats and obstacles, jamming sources), mission plan (e.g., typical factors encountered during a mission, changes to the plan), environment of deployment (e.g., weather, surrounding terrain, surrounding other navigation facilities, surrounding mobile facilities), types of sensor/internal navigation facility (e.g., common to other multi-sensor navigation facilities, expected performance under conditions), and/or profiles of external navigation sources (e.g., RF navigation signals and sources, visual field data, data channels of navigation data).

The information module 120 uses the models and situation data 125 received from the situation module 130 to determine the estimates of quality and integrity. Because the situation data 125 may change dynamically (as explained below), the information module 120 may update the resulting models accordingly. In this manner, the situation data 125 is used in the integrity monitor module's 110 initial assessment of the reliability of various data sources 105 and also used in subsequent assessments of the data sources 105 over time.

In some embodiments, the information module 120 may also receive source information from one or more of the data sources 105 and use this source information in its models to determine the estimates of integrity and quality. In one embodiment, the information module 120 may determine an estimate of integrity of the source information from one data source 105 by comparing it against source information from one or more other data sources 105.

For example, the information module 120 may receive source information from one or more data sources 105 regarding the tides in the geographical area(s) that the object has been traveling over, e.g., for the past three hours. The model may be dynamically updated with source information and situation data 125 to reflect any changes in the tide environment over time. For example, if source information from a first data source 105 indicates a low tide for the past three hours and abruptly indicates that the tide is now high, the model may be updated with the source information from the first data source 105 and, based on source information from other data sources 105 and/or situation data 125 received from the situation module 130, the information module 120 may provide an updated estimate of the integrity of the first data source. Similarly, the information module 120 may receive source information from one or more data sources 105 related to stars, and the model may be updated to reflect any changes over time. For example, if source information from one data source 105 indicates that a star is located at a position that deviates widely from past source information from this data source 105 or other data sources 105 regarding the same star, the information module 120 may be updated with the source information from the data source(s) 105 and the information module 120 may use this source information in its model(s) to provide an updated estimate of the integrity of the data source(s) 105.

In another example, the information module 120 may use situation data 125 received from the situation module 130 regarding a newly launched enemy mission known to be within the object's vicinity. The information module 120 may use this situation data 125 to estimate the quality and/or integrity of the source information from the data sources 105 in the vicinity of the object that may be disrupted or spoofed.

In another example, the information module 120 may receive situation data 125 from the situation module 130 regarding a time of day and use this situation data 125 along with source information from data source(s) 105 to provide estimates of the quality and/or integrity using its statistical models. For instance, celestial objects that orbit the earth are known to provide unreliable source information at certain times of the day (e.g., around midnight). Consequently, the information module 120 may use the time of day situation data 125 to estimate the quality and/or integrity of the source information from these celestial objects over time so that this source information is not used in the navigation system 100 to determine the navigation information when the source information is unreliable, e.g., around midnight.

The information module 120 includes one or more models that describe a dynamic and probabilistic state of the source information in order to determine the estimates of quality and/or integrity of the source information for each data source 105. When the situation in which the source information is obtained is fully known, then the information module 120 may use a dynamic and probabilistic state of the source information. When the situation in which the source information is obtained is uncertain, then the information module 120 may use a probabilistic state representing the uncertainty associated with the source information.

For example, the situation data 125 may include low visibility due to fog within the immediate environment of the data source(s) 105. Although the data sources 105, e.g., image sensors, might be functioning properly (i.e., they have good perceived quality), the low visibility might render the source information, e.g., the image data, unreliable. Consequently, the information module 120 may use model(s) based on a probabilistic state in order to determine an estimate of integrity of the data sources 105. When the fog lifts and visibility becomes clear, the information module 120 may use model(s) based on a dynamic and probabilistic state to determine the estimate of integrity of the source information.

In another example, the situation data 125 may include data indicating that enemy vehicles in the vicinity of one or more data sources 105 are equipped with radar jamming devices. The proximity and capabilities of the enemy vehicles indicate an uncertain situation with respect to any data sources 105 that rely on radar in that area. In this situation, the information module 120 may use model(s)

based on a probabilistic state in order to determine an estimate of integrity of the data sources 105.

The Integrity Monitor Module

The integrity monitor module 110 receives the source information generated by each of the data sources 105 and receives the estimates of quality and/or integrity from the information module 120 to determine whether to validate and supply the source information to the navigation state estimator 115 and, if so, what quality that source information should have. As mentioned above, the integrity monitor module 110 may determine integrity and/or quality based on information from the data sources 105, information from the information module 120, or both. The integrity monitor module 110 sends the validated source information to the navigation state estimator 115, and in some embodiments, the integrity monitor module 110 may refrain from sending source information that has not been validated.

In some embodiments, the integrity monitor module 110 uses navigation information previously generated by the navigation state estimator 115 to determine the integrity and/or quality of the source information. The integrity monitor module 110 may use multiple techniques to determine the integrity of source information. For example, the integrity monitor module 110 may compare $z_i$ to a value of the source information determined by the navigation state estimator 115, for instance, in the case of an extended Kalman filter, $h(\hat{X}_{k|k-1})$, and compare the resultant residual (e.g., the difference between $z_1$ and the value determined by the navigation state estimator 115) to that which would be acceptable given the expected quality of that source information. For example, the resultant residual may be compared to a threshold value and deemed acceptable if it is below the threshold value. In various embodiments, the threshold value may be predetermined, provided dynamically by a sensor, or provided by the information model 120.

As mentioned above, the data source 105 that provides the source information may also provide the quality of that source information, or the information model 120 may provide expected quality of the source information, or both the data source 105 and information model 120 may provide expected quality. The integrity monitor module 110 may determine the integrity and/or quality of the source information from the data source 105 based on a comparison between the source information and its expected value and may ignore the source information when the difference is greater than a quality threshold value or an integrity threshold value and may validate the source information when the quality and/or integrity of the source information falls within a predetermined acceptable range. For example, when the information model 120 and the data source 105 both provide expected quality of the source information and the values substantially differ (e.g., by a percentage, by a numerical factor, based on a threshold), the integrity monitor module 110 may use that difference as a reason to ignore the source information and not validate it, or the integrity monitor module 110 may override the source information quality provided by the data source 105 and replace it with the information model 120 source information quality and then validate and pass the source information to the navigation state estimator 115 with the quality estimate the integrity monitor module 110 provides.

When the integrity monitor module 110 validates source information, the integrity monitor module 110 passes the source information to the navigation state estimator 115 and also passes the quality of the validated source information. As described above, the integrity monitor module 110 receives the source information from one or more data sources 105 and determines the quality and/or integrity of the data sources 105 using the estimate of quality and/or integrity from the information module 120 along with the quality and/or integrity of source information from the data sources 105. The source information from the data sources 105 may be processed, using standard data processing techniques as known by one skilled in the art, before the source information is used by the integrity monitor module 110 and/or the information module 120 and passed to the navigation state estimator 115. Therefore, the source information used in the navigation system 100 disclosed herein may include processed or unprocessed source information.

The Navigation State Estimator

The navigation state estimator 115 uses the validated source information from the integrity monitor module 110 to determine the navigation information for one or more objects in real time. The navigation state estimator 115 provides an estimate of the navigation information at any given time, regardless of how often the navigation state estimator 115 receives the validated source information from the integrity monitor module 110. The navigation state estimator 115 may function using discrete-time Markov processes with a probability density function $f(x|\acute{x})$ that denotes the probability of moving from state $\acute{x}$ to state x. For example, given some state $\{X_n\}_{n\geq 1}$, the source information $\{Z_n\}_{n\geq 1}$ have marginal densities that are given by $z_n|(X_n=x_n)$ ~$g(z_n|X_N)$. The implementation of the navigation state estimator 115 may be accomplished by estimation algorithms such as an extended Kalman filter, a particle filter, a non-linear moment filter, a Hidden Markov Model, and/or a Bayesian filter.

Whenever source information, $z'_i$, is available from the integrity monitor module 110, the navigation state estimator 115 updates the navigation information or state estimate $\hat{X}_n$ based on whatever additional or new information may be available in the source information to form the best possible state estimate at that point in time. The navigation state estimator 115 then propagates the navigation information or state estimate forward in time as needed by the navigation system 100 and in time increments called navigation epochs that may or may not be regular time intervals. The navigation epoch does not need to be constant and does not need to be synchronized with inputs of the validated source information from the integrity monitor module 110 to the navigation state estimator 115. For example, the navigation state estimator 115 may determine the navigation information every second, every few seconds, every minute, or every few minutes, even though the integrity monitor module 110 may be providing validated source information to the navigation state estimator 115 in time intervals longer or shorter than the navigation epochs.

As mentioned above, the navigation state estimator 115 may also transmit the navigation information back to the integrity monitor module 110, where it may be used to validate subsequent source information received from the data sources 105 and/or information module 120. For example, the navigation state estimator 115 receives accelerations and angular rates from data sources 105, such as accelerometers and gyroscopes. This source information may be measured over a period of time, and the result used to determine the navigation information for an object. However, misalignment and bias errors are inherent in the accelerations and angular rates, and both compound over time. When the navigation state estimator 115 receives a validated and updated geolocation from a GPS system, the source information from the GPS system may be used to bound or otherwise correct for these errors.

As mentioned above, FIG. 2 depicts an exemplary environment in which the navigation system 100 may operate. In this example, object 101a is an aircraft whose navigation information is determined by the navigation system 100. The navigation system 100 includes numerous data sources 105, such as a GPS satellite, COSS system, stars, planets, and cell phone tower. The data sources 105 send source information to the navigation system 100.

In one embodiment, the navigation system 100 may be configured to communicate with other aircraft 180, unmanned vehicles 181, personal devices 182 of people, vehicles 183, and vice versa. Any of these entities 180-183 may evaluate the environment of the data sources 105 to obtain situation data 125. Then, the entities may transmit the situation data 125 to the situation module 130 of the navigation system 100, which, in this embodiment, is located on the aircraft 101a. The navigation system 100 may use its situation module 130, information module 120, and integrity module 110 to determine which data sources 105 to rely on and use in its navigation state estimator 115, as described above.

FIG. 3 depicts another exemplary environment in which the navigation system 100 may operate. In this example, the navigation system 100 is located entirely on a stationary platform 190, such as a base for a government agency. Thus, the stationary platform 190 houses the integrity monitor module 110, the information module 120, the situation module 130, and the navigation state estimator 115. The aircraft 101a receives source information from data sources 105 such as satellites 105, stars 105, planets 105, and cellphone towers 105 and transmits the source information to the navigation system 100. Furthermore, entities such as the aircrafts 180, 181 may evaluate the existing environment of the data sources 105 to obtain situation data 125, which is provided to the situation module 130 located on the stationary platform 190. The navigation system 100 uses the received situation data 125 and source information from the data sources 105 to determine which data sources 105 to rely on and use in its navigation state estimator 115, as described above.

FIG. 4 depicts a further exemplary environment in which the navigation system 100 may operate. In this example, modules of the navigation system 100 are distributed across multiple platforms 190, 191, such as different bases for a government agency. One platform 190 may house the integrity monitor module 110, the information module 120, and the situation module 130, while the other platform 191 may house the navigation state estimator 115. The aircraft 101a may receive source information from data sources 105 such as satellites 105, stars 105, planets 105, and cellphone towers 105 and transmit this information to the integrity monitor module 110 of one platform 190. The entities 180, 181 that are evaluating the environment of the data sources 105 will provide their situation data 125 to the situation module 130, also located on that platform 190. The integrity monitor module 110 provides validated source information and corresponding quality of the source information to the navigation state estimator 115 on the other platform 191, which uses this information to determine the navigation information of the aircraft 101a.

Other Features

In various embodiments, one or more components of the navigation system 100 may include one or more processors, memory, an operating system, and one or more programs or applications executing on them to perform the steps described herein (also referred to herein as a "computing platform"). The computing platform may be a stand-alone navigation device (e.g., a hand-held navigation device, a body-mounted navigation device, a smart phone, a tablet, or the like), a navigation device embedded in a user vehicle (e.g., an automobile, a ship, an airplane, a train, a special-purpose vehicle, or the like), or a navigation device embedded in a partially or fully autonomous vehicle (e.g., drone, driverless automobile, robotic device, underwater robotic device, missile, satellite), by way of example.

The embodiments of the invention described above are intended to be merely exemplary; numerous variations and modifications will be apparent to those skilled in the art. All such variations and modifications are intended to be within the scope of the present invention as defined by the appended claims.

What is claimed is:

1. A navigation system for determining quality and integrity of source information to determine navigation information of one or more objects during a mission, the system comprising:
    one or more data sources, each data source configured to provide the source information;
    a situation module configured to provide situation data for a given time of the mission;
    an information module configured to determine an estimate of the quality and an estimate of the integrity of the source information, at the given time, based on the source information received from the one or more data sources and based on the situation data received from the situation module for the given time;
    an integrity monitor module
        configured to receive the estimate of the quality and the estimate of the integrity of the source information from the information module and to receive the source information from the one or more data sources,
        configured to determine the integrity and the quality of the source information based on the estimate of the quality and the estimate of the integrity of the source information from the information module, and
        configured to validate the source information based on (1) the integrity of the source information, (2) the quality of the source information, or (3) both the integrity and the quality of the source information; and
    a navigation state estimator configured to determine the navigation information of the one or more objects based on the source information that was validated and corresponding quality of the source information received from the integrity monitor module.

2. The navigation system of claim 1, wherein the situation module is configured to provide expected situation data and wherein the given time is after a current time of the mission.

3. The navigation system of claim 2, wherein the navigation state estimator is configured to exclude source information based on the corresponding quality of the source information received from the integrity monitor module.

4. The navigation system of claim 2, wherein the navigation state estimator is further configured to modify a mission plan to maximize performance of the navigation system.

5. The navigation system of claim 4, wherein the navigation state estimator modifies the mission plan based on the expected situation data.

6. The navigation system of claim 5, wherein the mission plan includes a route and wherein the navigation state estimator modifies the route based on the expected situation data.

7. The navigation system of claim 2, wherein a modification to the situation data is based on past, current, and/or expected performance of the one or more data sources or the navigation system.

8. The navigation system of claim 7, wherein the modification to the situation data is based on a geographical region that overlaps with a mission plan.

9. The navigation system of claim 1, further comprising a graphical user interface to display the navigation information of the one or more objects to a user and permit the user to review and control the navigation information.

10. The navigation system of claim 9, wherein the situation module is configured to receive, from the graphical user interface, an instruction from the user and to provide the instruction to the information module as situation data.

11. The navigation system of claim 10, wherein the instruction modifies a mission plan to maximize performance of the navigation system.

12. The navigation system of claim 10, wherein the instruction modifies a mission plan to maintain an estimated arrival time at a destination of the navigation system.

13. The navigation system of claim 9, wherein the graphical user interface is configured to display information related to past, current, and/or expected performance of the navigation system conducting the mission.

14. The navigation system of claim 9, wherein the graphical user interface is configured to display contributions from the one or more data sources to the navigation information for the navigation system conducting the mission.

15. The navigation system of claim 1, wherein the navigation information includes geolocation, velocity, altitude, errors in position, errors in velocity, errors in attitude, time, clock errors, propagation delays, GPS satellite errors, sensor errors, sensor characterization parameters or any combination thereof.

16. The navigation system of claim 1, wherein the navigation state estimator includes an extended Kalman filter, a particle filter, a nonlinear moment filter, a Hidden Markov Model, a Bayesian filter or any combination thereof.

17. The navigation system of claim 1, wherein the situation module receives the situation data from databases with stored situation data previously known, from communication links with updated situation data that changes over time, from the one or more data sources, from detection systems that provide the situation data based on detected conditions, from the navigation state estimator with expected situation data, or any combination thereof.

18. The navigation system of claim 1, wherein the situation data includes environment conditions, position information, velocity, attitude, temporal information, platform configuration, mission phase, data source location, system health, mission plan, threat data, condition of a threat, threat operating capabilities, threat location, temperature, cloud cover, visibility, barometric pressure, terrain, time of year, tides, radiation environment, population, city information, street information, building information, known transmitters, known vehicles, visible stars, location of satellites in the sky, or any combination thereof.

19. A method for determining quality and integrity of source information to determine navigation information of one or more objects during a mission, the method comprising:
providing the source information from one or more data sources;
providing situation data from a situation module for a given time of the mission;
determining an estimate of the quality and an estimate of the integrity of the source information, at the given time, based on the situation data for the given time and the source information;
determining the integrity and the quality of the source information based on the estimate of the quality and the estimate of the integrity of the source information;
validating the source information based on (1) the integrity of the source information, (2) the quality of the source information, or (3) both the integrity and the quality of the source information;
determining the navigation information of the one or more objects based on the source information that was validated and corresponding quality of the source information; and
controlling at least one object to navigate to a desired destination based on the determined navigation information.

20. The method of claim 19, wherein the situation data is expected situation data and wherein the given time is after a current time of the mission.

21. The method of claim 20, further comprising:
excluding source information based on the corresponding quality of the source information.

22. The method of claim 20, further comprising:
modifying a mission plan to maximize performance of the one or more objects.

23. The method of claim 22, wherein the modifying the mission plan is based on the expected situation data.

24. The method of claim 23, wherein the mission plan includes a route and wherein the method further comprises:
modifying the route based on the expected situation data.

25. The method of claim 20, further comprising:
modifying the situation data based on past, current, and/or expected performance of the one or more data sources or the one or more objects.

26. The method of claim 25, wherein the modifying the situation data is based on a geographical region that overlaps with a mission plan.

27. The method of claim 19, further comprising:
displaying the navigation information of the one or more objects to a user and permitting the user to review and control the navigation information.

28. The method of claim 27, further comprising:
receiving an instruction from the user and providing the instruction as situation data.

29. The method of claim 28, wherein the instruction modifies a mission plan to maximize performance of the one or more objects.

30. The method of claim 28, wherein the instruction modifies a mission plan to maintain an estimated arrival time at a destination of the one or more objects.

31. The method of claim 27, further comprising:
displaying information related to past, current, and/or expected performance of the one or more objects conducting the mission.

32. The method of claim 27, further comprising:
displaying contributions from the one or more data sources to the navigation information for the one or more objects conducting the mission.

33. The method of claim 19, wherein determining the navigation information of the one or more objects includes applying an extended Kalman filter, a particle filter, a nonlinear moment filter, a Hidden Markov Model, a Bayesian filter, or any combination thereof to the source information that was validated and the corresponding quality of the source information.

34. The method of claim 19, wherein the situation module receives the situation data from databases with stored situation data previously known, from communication links with updated situation data that changes over time, from the one or more data sources, from detection systems that provide the situation data based on detected conditions, from a navigation state estimator with expected situation data, or any combination thereof.

* * * * *